United States Patent [19]

Harris

[11] Patent Number: 5,419,377

[45] Date of Patent: May 30, 1995

[54] AIR TRANSFER TIRE INFLATER

[76] Inventor: Jessica Harris, 14432 Mays Rd., Gulfport, Miss. 39503

[21] Appl. No.: 987,686

[22] Filed: Apr. 15, 1993

[51] Int. Cl.⁶ ............................................... B65B 31/00
[52] U.S. Cl. ....................................... 141/38; 152/415
[58] Field of Search ............... 141/38; 604/408; 251/7, 251/9, 10; 152/415

[56] References Cited

U.S. PATENT DOCUMENTS

| | | | |
|---|---|---|---|
| 318,091 | 5/1885 | Dart | 251/7 |
| 1,492,838 | 5/1924 | Dilweg | 141/38 |
| 2,237,559 | 4/1941 | Jenne | 152/415 |
| 2,663,348 | 12/1953 | Farris | 141/38 |
| 2,889,848 | 6/1959 | Redmer | 251/7 |
| 4,037,638 | 7/1977 | Mosca | 152/415 |
| 4,946,005 | 8/1990 | Levine | 184/28 |

Primary Examiner—Robert M. Fetsuga
Assistant Examiner—Steven O. Douglas

[57] ABSTRACT

An automobile tire inflator that embodies an air-flow passage way with two identical air chuck adapters, one attached at each end of the passage way, and an air-flow cut-off clip that can be closed or opened by hand attached to the air-flow passage way so as to open or close the air-flow passage way to the flow of air.

1 Claim, 1 Drawing Sheet

AIR TRANSFER TIRE INFLATER

BACKGROUND OF THE INVENTION

1. Field of the Invention

This invention relates to automobile tires, specifically an emergency way to inflate tires that have become flat or low in air.

2. Description of Prior Art

There has always been and still is a need for a simple inexpensive way to deal with the problem of being able to adequately transfer air from one tire to another. The problem to which applicant's invention is directed was approached previously by prior patents:

Dilweg U.S. Pat. No. 1,492,838 May 6, 1924
Jenne U.S. Pat. No. 2,237,559 Apr. 8, 1941
Farris U.S. Pat. No. 2,663,348 Dec. 22, 1953
Mosca U.S. Pat. No. 4,037,638 Jul. 26, 1977.

The Dilweg and Jenne patents focus on using a single length of tubing and a variety of two different air chuck adapters to control the air flow from one tire to another. The Farris patent shows the use of a stationary air valve and pressure gauge to control the air flow from one tire to another. The Mosca patent shows a very elaborate design that requires an operator to attach air chuck adapters to four tires and a spare before operation, wherein the air chuck adapters are interconnected with various length air hoses and junction connectors and the air hoses have cut-off clamps that are closed prior to the connection of the air chuck adapters to the tires.

SUMMARY OF THE INVENTION

The principal object of the invention is to provide a device for use in the inflation of automobile tires, in an emergency situation, that will be effective, safe, inexpensive, simple and easy to understand.

Another object is to provide a device that, by it's mere presence in an automobile, will allow peace of mind and remove the fear of one being stranded or being alone in an emergency situation with a flat tire.

The foregoing objects can be accomplished by providing a tire inflator device having two conventional air chuck adapters interconnected by a single length of hose and an air cut-off clip attached to the hose so as to be able to move from one end of the hose to the other while remaining attached to the hose.

DETAILED DESCRIPTION OF THE DRAWINGS

Figure 1:
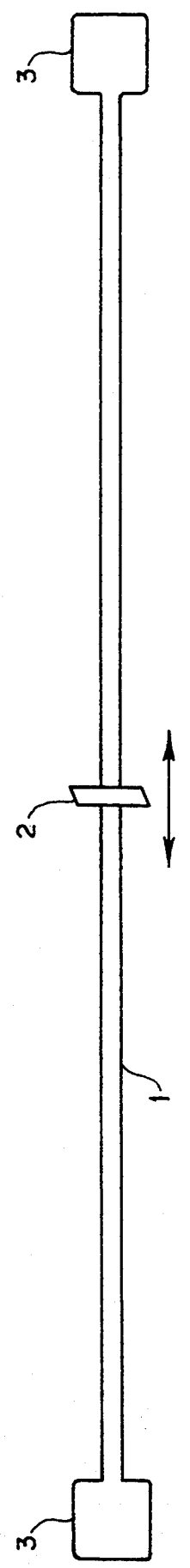
FIG. 1: shows a prospective view of the invention in its entirety.

FIG. 1 shows an air-flow passage way 1 comprised of an elongated piece of pliable material in the form of a hose. Attached to the free ends of the air-flow passage way 1 are two conventional air chuck adapters 3 usable with standard tire valves found on automobile and truck tires. Attached to the air-flow passage way 1 is a single air-flow cut-off clip 2 capable of closing off the flow of air through the air-flow passage way 1. The air-flow cut-off clip 2 is sized such as to allow it to be moved from one end of the air-flow passage way 1 to the other, while remaining attached to the air-flow passage way 1, thereby freeing up the hands of a user during the operation of the device.

DESCRIPTION OF THE PREFERRED EMBODIMENT

In use, one should first close the air-flow cut-off clip 2 such that the air-flow cut-off clip 2 closes the air-flow passageway 1 it is attached to. Then, attach one end of the air-flow passage way 1 to an inflated tire by means of one of the conventional air chuck adapter 3 and the opposite end to an air receiving tire by means of the other air chuck adapter 3. At this point, the cut-off clip 2 is opened. When the air pressure has balanced between the two tires and air-flow ceases to flow through the air-flow passage way 1, the air flow cut-off clip 2 is closed again in order to prevent the air from either tire from escaping into the atmosphere upon dis-connecting both air chuck adapters 3 from the tires.

I claim:

1. An automobile tire inflation device, comprising:
   a single length of hose having opposite free ends defining an air-flow passage way;
   two identical air chuck adapters, one attached to each free end of said hose; and
   a single air-flow cut-off clip mounted to said hose and being movable along said hose from one free end of said hose to the other opposite free end of said hose, while remaining attached to the hose, so as to free up the hands of a user while operating the device, wherein said air-flow cut-off clip is capable of opening and closing said air-flow passage way defined by said hose to the flow of air therethrough.

* * * * *